(12) United States Patent
Poornachary et al.

(10) Patent No.: US 12,341,669 B1
(45) Date of Patent: Jun. 24, 2025

(54) STAGED SAMPLING INFORMATION FOR NETWORK TRAFFIC

(71) Applicant: Juniper Networks, Inc., Sunnyvale, CA (US)

(72) Inventors: Manikandan Musuvathi Poornachary, Madurai (IN); Ramkrishna Sharma, Cupertino, CA (US); Ranjith Kumar Svv, Bangalore (IN); Atanu Mukherjee, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/477,237

(22) Filed: Sep. 28, 2023

(51) Int. Cl.
*H04L 43/022* (2022.01)
*H04L 43/0876* (2022.01)

(52) U.S. Cl.
CPC ........ *H04L 43/022* (2013.01); *H04L 43/0876* (2013.01)

(58) Field of Classification Search
None
See application file for complete search history.

(56) References Cited

U.S. PATENT DOCUMENTS

| | | | | |
|---|---|---|---|---|
| 2002/0080790 A1* | 6/2002 | Beshai | ................... | H04L 69/22 370/392 |
| 2006/0139646 A1* | 6/2006 | DiFoggio | ................ | E21B 49/10 356/436 |
| 2009/0316590 A1* | 12/2009 | Lund | ..................... | H04L 43/026 370/252 |
| 2010/0150004 A1* | 6/2010 | Duffield | ............. | H04L 41/0681 370/252 |
| 2013/0064079 A1* | 3/2013 | Zhang | ................... | H04L 43/026 370/230 |
| 2013/0258858 A1* | 10/2013 | Cherian | .................. | H04L 43/12 370/241 |
| 2014/0325649 A1* | 10/2014 | Zhang | ................... | H04L 43/026 726/23 |
| 2016/0105333 A1* | 4/2016 | Lenglet | .................. | H04L 43/20 370/252 |
| 2017/0279926 A1* | 9/2017 | Eastep | ..................... | H04L 43/12 |
| 2018/0133537 A1* | 5/2018 | Montantes | ................ | H02J 7/32 |
| 2019/0042298 A1* | 2/2019 | Sunku | .................... | G06F 9/5027 |
| 2022/0294711 A1* | 9/2022 | Rangarajan | ............ | H04L 47/32 |

\* cited by examiner

*Primary Examiner* — Sandarva Khanal
(74) *Attorney, Agent, or Firm* — Harrity & Harrity, LLP

(57) ABSTRACT

In some implementations, a sampling aggregator device may obtain, from one or more packet forwarding devices, first-stage sampling information associated with a packet at a first stage of a packet forwarding path. The sampling aggregator device may obtain, from the one or more packet forwarding devices, second-stage sampling information associated with the packet at a second stage of the packet forwarding path. The sampling aggregator device may determine aggregate sampling information based on the first-stage sampling information and the second-stage sampling information. The sampling aggregator device may transmit the aggregate sampling information to a sampling analyzer device.

20 Claims, 8 Drawing Sheets

140 Unicast Packet
WAN → LC-0/PFE-1 → LC-1/PFE-1 → LC-2/PFE-2 → WAN

|  | LC-0 | LC-1 | LC-2 |
|---|---|---|---|
| 142 User-Configured Value Field | Set User Configured Value | Retained from Previous Stage | Retained from Previous Stage |
| 144 Unique Packet ID Field | Generate Unique Packet ID | Retained from Previous Stage | Retained from Previous Stage |
| 146 LC ID Field | 0 | 1 | 2 |
| 148 PFE ID Field | 1 | 1 | 2 |
| 150 Application ID Field | Programmed Application ID | Retained from Previous Stage | Retained from Previous Stage |
| 152 Stage ID Field | 1 | Incremented by one (2) | Incremented by one (3) |

FIG. 1C

154
Multicast/Broadcast Packet
WAN → LC-0/PFE-1 → LC-1/PFE-1 (1st Leg)
LC-0/PFE-1 → LC-2/PFE-2 (2nd Leg)

| | LC-0 | LC-1 (1st Leg) | LC-2 (2nd Leg) |
|---|---|---|---|
| 142 User-Configured Value Field | Set User Configured Value | Retained from Previous Stage | Retained from Previous Stage |
| 144 Unique Packet ID Field | Generate Unique Packet ID | Retained from Previous Stage | Retained from Previous Stage |
| 146 LC ID Field | 0 | 1 | 2 |
| 148 PFE ID Field | 1 | 1 | 2 |
| 150 Application ID Field | Programmed Application ID | Retained from Previous Stage | Retained from Previous Stage |
| 152 Stage ID Field | 1 | Incremented by one (2) | Incremented by one (2) |

FIG. 1D

STAGED SAMPLING INFORMATION FOR NETWORK TRAFFIC

BACKGROUND

A computer network is a collection of interconnected computing devices that exchange data and share resources. In a packet-based network, the computing devices communicate data by dividing the data into small blocks called packets. Devices within the network, such as routers and switches, forward the packets through the network from a source device to a destination device. The destination device extracts the data from the packets and assembles the data into its original form. Various protocols exist that allow the intermediate network devices, such as the routers and switches, to collect and report traffic and/or traffic statistics. For example, the network devices may deploy sampling mechanisms that collect traffic statistics on interfaces of the device where traffic is received and/or transmitted. In accordance with the protocols, the network device may periodically export records containing traffic statistics (sometimes referred to herein as samples and/or sampling information) to a centralized device, sometimes referred to as a packet flow collector or simply a flow collector. Accordingly, a network administrator may use the packet flow collector to analyze overall network traffic flow.

SUMMARY

Some implementations described herein relate to a method. The method may include obtaining, at a sampling aggregator device from one or more packet forwarding devices, first-stage sampling information associated with a packet at a first stage of a packet forwarding path. The method may include obtaining, at the sampling aggregator device from the one or more packet forwarding devices, second-stage sampling information associated with the packet at a second stage of the packet forwarding path. The method may include determining, by the sampling aggregator device, aggregate sampling information based on the first-stage sampling information and the second-stage sampling information. The method may include transmitting, by the sampling aggregator device to a sampling analyzer device, the aggregate sampling information.

Some implementations described herein relate to a sampling aggregator device. The sampling aggregator device may include one or more memories and one or more processors. The one or more processors may be configured to obtain, at a sampling aggregator device from a packet routing device, first-stage sampling information associated with a packet at a first stage of a packet forwarding path. The one or more processors may be configured to obtain, at the sampling aggregator device from the packet routing device, second-stage sampling information associated with the packet at a second stage of the packet forwarding path. The one or more processors may be configured to determine aggregate sampling information based on the first-stage sampling information and the second-stage sampling information. The one or more processors may be configured to transmit, to a sampling analyzer device, the aggregate sampling information.

Some implementations described herein relate to a non-transitory computer-readable medium that stores a set of instructions. The set of instructions, when executed by one or more processors of a sampling aggregator device, may cause the sampling aggregator device to obtain, at a sampling aggregator device from a first packet forwarding engine, first-stage sampling information associated with a packet at a first stage of a packet forwarding path. The set of instructions, when executed by one or more processors of the sampling aggregator device, may cause the sampling aggregator device to obtain, at the sampling aggregator device from a second packet forwarding engine, second-stage sampling information associated with the packet at a second stage of the packet forwarding path. The set of instructions, when executed by one or more processors of the sampling aggregator device, may cause the sampling aggregator device to obtain, at the sampling aggregator device from a third packet forwarding engine, third-stage sampling information associated with the packet at a third stage of the packet forwarding path. The set of instructions, when executed by one or more processors of the sampling aggregator device, may cause the sampling aggregator device to determine aggregate sampling information based on the first-stage sampling information, the second-stage sampling information, and the third-stage sampling information. The set of instructions, when executed by one or more processors of the sampling aggregator device, may cause the sampling aggregator device to transmit, to a sampling analyzer device, the aggregate sampling information.

BRIEF DESCRIPTION OF THE DRAWINGS

FIGS. 1A-1D are diagrams of an example implementation associated with staged sampling information for network traffic.

DETAILED DESCRIPTION

Figure 1A:
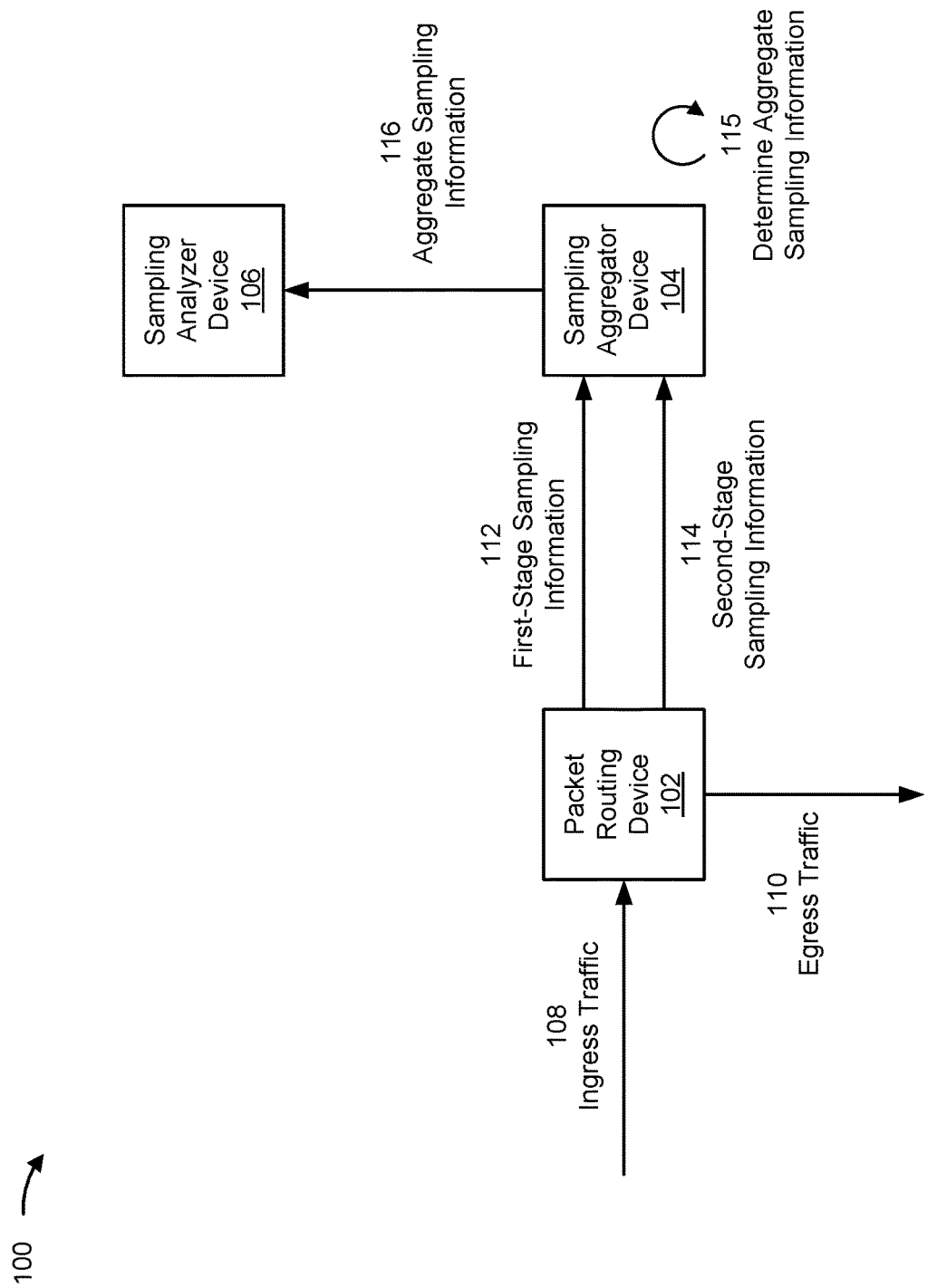

The following detailed description of example implementations refers to the accompanying drawings. The same reference numbers in different drawings may identify the same or similar elements.

Network sampling services, such as services that enable network devices (e.g., routers and switches) to collect and report traffic statistics to a flow collector, may provide limited information about packets being sampled. For example, some sampling services may work at a packet forwarding engine (PFE) level and/or may be direction-specific. More particularly, a given sampling service may be associated with an ingress PFE and/or an ingress portion of a packet forwarding path, while another sampling service may be associated with an egress PFE and/or an egress portion of a packet forwarding path. In this regard, sampling services applied at various devices (e.g., PFEs) and/or directions (e.g., ingress or egress) may be transparent to one another. For example, sampling features applied by an ingress PFE may be transparent to sampling features applied by an egress PFE, and/or sampling features applied by an egress PFE may be transparent to sampling features applied by an ingress PFE.

Moreover, network sampling services may not provide information as to a nature of the traffic sampled. For example, the sampling services may not indicate whether a packet is forwarded as plain Internet Protocol (IP) version 4 (IPv4) traffic, may not indicate layer 3 (L3) or layer 2 (L2) virtual private network (VPN) information associated with the packet, or may not indicate segment routing IP version 6 (SRv6) segment header information associated with the packet, among other information. For example, an egress sampling service (e.g., a sampling service associated with an egress PFE and/or an egress portion of a packet forwarding path, sometimes referred to herein simply as egress sampling) may provide certain tunnel information, but information about an original incoming packet may be lost. For example, the egress sampling may not provide information as to whether a label associated with a packet (e.g., a label associated with a multiprotocol label switching (MPLS) routing technique) was swapped (e.g., whether a first label associated with the packet was replaced with a second label associated with the packet) or popped (e.g., whether a label associated with the packet was removed and thus the packet was forwarded as an unlabeled packet), among other information.

Moreover, an ingress sampling service (e.g., a sampling service associated with an ingress PFE and/or an ingress portion of a packet forwarding path, sometimes referred to herein simply as ingress sampling) may provide information associated with an outgoing interface (OIF) using a fabric token identifier chosen for a packet, among other information, but may not provide other egress information associated with a packet. For example, ingress sampling may not provide information as to quality of service (QOS) handling associated with the packet, accurate egress information associated with the packet, a type of encapsulation associated with the packet, among other information.

In this way, a flow collector or similar network device may be provided with limited information, such as disparate information collected from ingress sampling and egress sampling. Accordingly, the flow collector may not be provided with adequate information to identify how a packet is handled along a packet forwarding path (e.g., from ingress to egress). In this regard, incomplete sampling information may be used when reconfiguring network devices (e.g., routers, switches, PFEs), thereby resulting in suboptimal configurations and thus inefficient power, computing, and network resource consumption.

Some implementations described herein enabling sampling at a system level and/or at various stages of a packet forwarding path (sometimes referred to herein as staged sampling or aggregate sampling), thereby providing more robust information about a packet forwarding path and/or more robust information about one or more packet forwarding devices associated with the packet forwarding path, among other examples. In some implementations, a sampling aggregator device may receive sampling information from one or more packet forwarding devices (e.g., one or more PFEs, one or more packet routing devices (e.g., routers), one or more network switching devices, or the like). The sampling information may contain sampling information from various portions of a packet forwarding path, such as an ingress portion of the packet forwarding path, a loopback portion of the packet forwarding path, and/or an egress portion of the packet forwarding path, among other examples. The sampling aggregator device may aggregate the sampling information, such as by associating various samples with each other via a unique packet identifier appended to the various samples. The sampling aggregator device may forward the aggregate sampling information to a sampling analyzer device, such as a flow collector or a similar device. As a result, a sampling analyzer device (e.g., a flow collector) may be provided with robust sampling information, such as detailed information as to how a packet was handled along a packet forwarding path (e.g., from ingress to egress). In this regard, network devices (e.g., routers, switches, PFEs) may be reconfigured using detailed sampling information, thereby resulting in optimal network device configurations and thus more efficient power, computing, and network resource consumption.

Figure 1B:
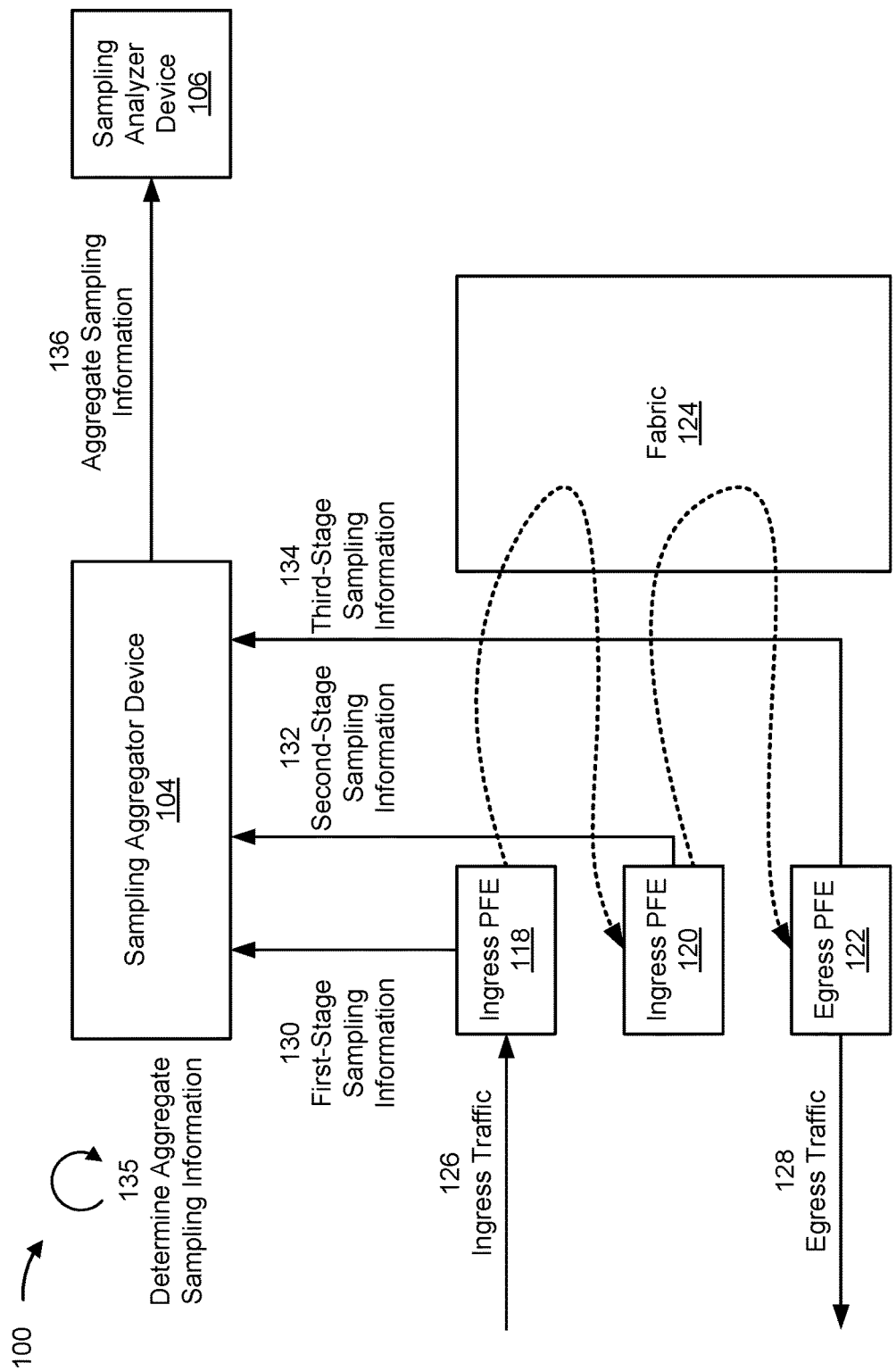

FIGS. 1A-1D are diagrams of an example implementation 100 associated with staged sampling information for network traffic. As shown in FIGS. 1A-1B, example implementation 100 includes one or more packet forwarding devices (e.g., a packet routing device 102, as shown in FIG. 1A, and/or a PFE, such as a first ingress PFE 118, a second ingress PFE 120, and/or an egress PFE 122, as shown in FIG. 1B), a sampling aggregator device 104, and a sampling analyzer device 106. Moreover, in some implementations, one or more packet forwarding devices may be associated with a switch fabric, shown as fabric 124 in FIG. 1B. These devices are described in more detail below in connection with FIGS. 2-4.

In some implementations, staged sampling and/or aggregate sampling may be enabled at a system level such that sampling information may be provided to the sampling aggregator device 104 and/or to the sampling analyzer device 106 (e.g., a flow collector or a similar device) at various stages of the packet forwarding path. For example, once a packet is marked as eligible for staged sampling (e.g., by a firewall device associated with a packet forwarding path), sampling information may be generated at each stage of a packet forwarding path (e.g., an ingress stage, a loopback stage, and/or an egress stage, among other examples). In some implementations, sampling information may refer to a copy of a packet at a corresponding stage of a packet forwarding path, a truncated copy of the packet (e.g., header information and/or truncated header information) at the corresponding stage of the packet forwarding path, and/or similar information associated with the packet at the corresponding stage of the packet forwarding path. Once a packet is marked for sampling, the packet may be assigned a unique packet identifier (ID) that is carried by the packet to each stage (e.g., from an ingress PFE to an egress PFE). The sampling information at each stage may be marked with the unique packet ID and/or a stage ID (e.g., an ID indicating which stage the sampling information originated from), such as for a purpose of the sampling aggregator device 104 identifying that sampling information from various stages is associated with the same packet. Accordingly, the sampling information associated with a single packet from various stages of a packet forwarding path (e.g., a path that the packet travels from ingress to egress) may be aggregated, such as for a purpose of determining packet handling information, encapsulation information, or similar information that may not otherwise be available from device-specific (e.g., PFE-specific) and/or direction-specific (e.g., ingress-specific or egress-specific) sampling.

More particularly, FIG. 1A shows an implementation in which a packet routing device 102 (e.g., a network router), as one example of a packet forwarding device, provides sampling information at various stages of a packet forwarding path. As shown in FIG. 1A, the packet routing device 102 may be configured to forward traffic through a network along a packet forwarding path, such as by receiving ingress traffic from a device (e.g., an endpoint device, a packet routing device, and/or a similar network device), as shown by reference number 108, and forwarding egress traffic to another device (e.g., a packet routing device, a server device, and/or a similar network device), as shown by reference number 110. In such implementations, the packet routing device 102 may be capable of collecting sampling information at various stages of the packet forwarding path and/or transmitting sampling information from the various stages of the packet forwarding path to the sampling aggregator device 104.

For example, the packet routing device 102 may collect first-stage sampling information (e.g., sampling information associated with a first stage of the packet forwarding path) and may transmit the first-stage sampling information to the sampling aggregator device 104, as shown by reference number 112. Similarly, the packet routing device 102 may collect second-stage sampling information (e.g., sampling information associated with a second stage of the packet forwarding path, which may be a different stage than the first stage) and may transmit the second-stage sampling information to the sampling aggregator device 104, as shown by reference number 114. In some implementations, the sampling aggregator device 104 may be co-located with the packet routing device 102 and/or otherwise associated with the packet routing device 102 or a similar packet forwarding device, which is sometimes referred to as an on-box device, while, in some other implementations, the sampling aggregator device 104 may be remote from the packet routing device 102 or otherwise separate from the packet routing device 102 or a similar packet forwarding device, which is sometimes referred to as an off-box device.

Additionally, or alternatively, the packet routing device 102 may mark certain packets for staged sampling, and thus collecting the first-stage sampling information and the second-stage sampling information may be based on the packet being marked for staged sampling. For example, the packet routing device 102 may mark every N-th packet for staged sampling, based on a staged sampling rate associated with the packet routing device 102 and/or the sampling aggregator device 104 (e.g., the staged sampling rate may correspond to 1/N). Accordingly, every N-th packet arriving at the packet routing device 102 may be marked for sampling, such that sampling information is collected at various stages of the packet forwarding path (e.g., the first stage and the second stage, in the example depicted in FIG. 1A) for every N-th packet. Additionally, or alternatively, when marking the packet for staged sampling, the packet routing device 102 may mark the packet with a unique packet ID. In such implementations, the packet routing device 102 may include the unique packet ID and/or similar information (e.g., a stage ID corresponding to a stage of the packet forwarding path at which the sampling was obtained, such as "1" for the first stage and "2" for the second stage) in the sampling information, such that the first-stage sampling information and the second-stage sampling information may be associated with each other (e.g., by the sampling aggregator device 104). Aspects of the unique packet ID and the stage ID are described in more detail below in connection with FIGS. 1C and 1D.

In some implementations, the first stage of the packet forwarding path may be an ingress portion of the packet forwarding path, and thus the first-stage sampling information may be associated with packet handling at an ingress portion of the packet forwarding path. Moreover, the second stage of the packet forwarding path may be an egress portion of the packet forwarding path, and thus the second-stage sampling information may be associated with the packet handling at the egress portion of the packet forwarding path. Additionally, or alternatively, the packet routing device 102 may be associated with multiple PFEs, such as a first PFE associated with the ingress path (sometimes referred to herein as an ingress PFE) and a second PFE associated with the egress path (sometimes referred to herein as an egress PFE). Accordingly, the first-stage sampling information may be associated with an ingress PFE and/or the second-stage sampling information may be associated with an egress PFE.

In some implementations, the sampling information may indicate how the packet was handled and/or routed by the packet routing device 102 at the various stages of the packet forwarding path, among other information. For example, the first-stage sampling information may indicate at least one of Ethernet header information, IPv6 header information, payload information, or similar information associated with the packet at the first stage of the packet forwarding path. Additionally, or alternatively, the second-stage sampling information may indicate at least one of Ethernet header information, IPv6 header information, SRv6 segment header information, payload information, or similar information associated with the packet at the second stage of the packet forwarding path. Based on the multi-stage sampling information (e.g., the first-stage sampling information and the second-stage sampling information in the example shown in FIG. 1A, but which may include additional stage sampling information in other examples), the sampling aggregator device 104 may be capable of deriving additional information associated with the packet, such as information associated with how the packet moved through the packet forwarding path from the first stage (e.g., ingress stage) to the second stage (e.g., egress stage).

More particularly, as indicated by reference number 115, the sampling aggregator device 104 may determine aggregate sampling information based on multi-stage sampling information (e.g., the first-stage sampling information and the second-stage sampling information). In some aspects, the aggregate sampling information may include a combination of the first-stage sampling information and the second-stage sampling information. For example, the sampling aggregator device 104 may identify that the first-stage sampling information and the second-stage sampling information are associated with a same packet (e.g., via the unique packet ID appended to each sample) and/or the sampling aggregator device 104 may identify that the second-stage sampling information is associated with the packet at a later portion in the packet forwarding path than the first-stage sampling information (e.g., via the respective stage IDs appended to each sample). Accordingly, the sampling aggregator device 104 may combine the two sets of sampling information into a single, final sample, which may form at least part of the aggregate sampling information.

Additionally, or alternatively, the sampling aggregator device 104 may derive additional information from the sampling information to be included as at least a portion of the aggregate sampling information. For example, in implementations in which the first-stage sampling information indicates at least one of Ethernet header information, IPv6 header information, payload information, or similar information associated with the packet at the first stage (e.g., the ingress stage), and/or the second-stage sampling information indicates at least one of Ethernet header information, IPv6 header information, SRv6 segment header information, payload information, or similar information associated with the packet at the second stage (e.g., the egress stage), the sampling aggregator device 104 may derive additional information associated with the packet, such as IPv6 segment routing header (IPv6SRH) segment information associated with the packet and/or a segment list associated with the packet, among other examples. Accordingly, the IPV6SRH segment information associated with the packet, the segment list associated with the packet, and/or similar information associated with the packet may form at least part of the aggregate sampling information.

As indicated by reference number 116, the sampling aggregator device 104 transmit the aggregate sampling information to the sampling analyzer device 106, which may be a flow collector or a similar device. Put another way, the sampling aggregator device 104 may transmit a final sample to the sampling analyzer device 106 that includes at least a portion of the first-stage sampling information (e.g., Ethernet header information, IPv6 header information, payload information, or similar information associated with the packet at the first stage), at least a portion of the second-stage sampling information (e.g., Ethernet header information, IPv6 header information, SRv6 segment header information, payload information, or similar information associated with the packet at the second stage), and/or information derived from the first-stage sampling information and/or the second-stage sampling information (e.g., the IPV6SRH segment information and/or the segment list). In this way, the sampling analyzer device 106 (e.g., a flow collector), and/or a network administrator or similar entity associated with the sampling analyzer device 106, may use the aggregate sampling information to analyze overall network traffic flow and/or performance, thereby enabling optimized network device configurations and thus more efficient power, computing, and network resource consumption.

Although the implementation described above in connection with FIG. 1A is associated with the packet routing device 102 and two-stage sampling, in some other implementations, staged sampling may be associated with different network devices, a different quantity of network devices, and/or a different quantity of stages. For example, FIG. 1B shows an implementation associated with multiple PFEs (e.g., a first ingress PFE 118, a second ingress PFE 120, and an egress PFE 122), as other example packet forwarding devices, that provide sampling information to the sampling aggregator device 104 at various stages of a packet forwarding path. As shown in FIG. 1B, in a similar manner as the packet routing device 102, the PFEs 118, 120, 122 may be configured to forward traffic through a network, such as by receiving ingress traffic from a device (e.g., an endpoint device, a packet routing device, and/or a similar network device), as shown by reference number 126, and forwarding egress traffic to another device (e.g., a packet routing device, a server device, and/or a similar network device), as shown by reference number 128. In some implementations, the PFEs 118, 120, 122 may forward packets through the network by forwarding the packets through the PFEs 118, 120, 122 via the fabric 124, as shown using the dashed lines in FIG. 1B. In such implementations, for a packet marked for staged sampling, each PFE 118, 120, 122 may transmit sampling information to the sampling aggregator device 104, such that more than two samples may ultimately be provided to the sampling aggregator device 104.

For example, in some implementations, a packet forwarded through the network by the PFEs 118, 120, 122 may be an MPLS packet or a similar packet. In such implementations, an ingress packet arriving at the first ingress PFE 118 (e.g., via the ingress traffic indicated by reference number 126) may be forwarded to the first ingress PFE 118 over a non-MPLS network, such as by using MPLS over generic routing encapsulation (MPLSoGRE) in order to encapsulate an MPLS packet inside an IP tunnel. Accordingly, the packet arriving at the first ingress PFE 118 may be referred to as an MPLSoGRE packet. The first ingress PFE 118 may be a PFE configured to remove a GRE encapsulation from the MPLSoGRE packet (sometimes referred to as GRE-decapping the MPLSoGRE packet), resulting in an MPLS packet. In that regard, a stage of the packet forwarding path associated with the first ingress PFE 118 is sometimes referred to herein as an ingress stage and/or a GRE-decapping stage. The MPLS packet may be looped back (e.g., via the fabric 124) to the second ingress PFE 120, such as for a purpose of performing a label lookup associated with the MPLS packet. In that regard, a stage of the packet forwarding path associated with the second ingress PFE 120 is sometimes referred to herein as a loopback stage and/or a label-lookup stage. Additionally, or alternatively, the MPLS packet may be forwarded (e.g., via the fabric 124) to the egress PFE 122, such as for performing egress processing. In that regard, a stage of the packet forwarding path associated with the egress PFE 122 is sometimes referred to herein as an egress stage and/or an egress processing stage.

In such implementations, as indicated by reference number 130, the first ingress PFE 118 may transmit first-stage sampling information to the sampling aggregator device 104, such as sampling information associated with the packet at the ingress stage and/or the GRE-decapping stage. Moreover, as indicated by reference number 132, the second ingress PFE 120 may transmit second-stage sampling information to the sampling aggregator device 104, such as sampling information associated with the packet at the loopback stage and/or the label-lookup stage. Furthermore, as indicated by reference number 134, the egress PFE 122 may transmit third-stage sampling information to the sampling aggregator device 104, such as sampling information associated with the packet at the egress stage and/or the egress-processing stage. Put another way, in this implementation, the sampling aggregator device 104 may obtain, from a first PFE (e.g., the first ingress PFE 118), first-stage sampling information associated with a packet at a first stage of a packet forwarding path (e.g., an ingress path of the packet forwarding path); the sampling aggregator device 104 may obtain, from a second PFE (e.g., the second ingress PFE 120), second-stage sampling information associated with the packet at a second stage of a packet forwarding path (e.g., a loopback path of the packet forwarding path); and/or the sampling aggregator device 104 may obtain, from a third PFE (e.g., the egress PFE 122), third-stage sampling information associated with a packet at a third stage of a packet forwarding path (e.g., an egress path of the packet forwarding path).

In some implementations, the first ingress PFE 118 may be configured to mark an arriving packet (e.g., an MPLSoGRE packet) for staged sampling and/or may be configured to assign the packet a unique packet ID, in a similar manner as described above in connection with the packet routing device 102. More particularly, the first ingress PFE 118 may mark every N-th packet for sampling, based on a staged sampling rate (e.g., a staged sampling rate equal to 1/N) associated with the first ingress PFE 118 and/or the sampling aggregator device 104. Accordingly, every N-th packet arriving at the first ingress PFE 118 may be marked for sampling, such that sampling information is collected at various stages of the packet forwarding path (e.g., the first stage, the second stage, and the third stage in the example depicted in FIG. 1B) for every N-th packet. Additionally, or alternatively, when marking the packet for sampling, the packet routing device 102 may mark the packet with a unique packet ID. In such implementations, the packet routing device 102 may include the unique packet ID and/or similar information (e.g., a stage ID corresponding to a stage of the packet forwarding path at which the sampling was obtained, such as "1" for the first stage, "2" for the second stage, and "3" for the third stage) in the sampling information, such that the first-stage sampling information, the second-stage sampling information, and the third-stage sampling information may be associated with each other by the sampling aggregator device 104. Aspects of the unique packet ID and the stage ID are described in more detail below in connection with FIGS. 1C and 1D.

In some implementations, the sampling information (e.g., the three-stage sampling information, in the example depicted in FIG. 1B) may indicate how the packet was handled and/or routed by the PFEs 118, 120, 122 at the various stages of the packet forwarding path (e.g., the ingress stage and/or the GRE-decapping stage, the loopback stage and/or the label-lookup stage, and/or the egress stage and/or the egress-processing stage), among other information. For example, the first-stage sampling information and/or the second-stage sampling information may indicate at least one of Ethernet header information, IPv6 header information, payload information, or similar information associated with the packet at the first stage (e.g., ingress stage) and the second stage (e.g., loopback stage), respectively. Additionally, or alternatively, the third-stage sampling information may indicate at least one of Ethernet header information, IPv6 header information, SRv6 segment header information, payload information, or similar information associated with the packet at the third stage (e.g., egress stage). Based on the multi-stage sampling information, the sampling aggregator device 104 may thus be capable of identifying additional information associated with the packet, such as information associated with how the packet moved through the packet forwarding path from the first stage (e.g., ingress stage) to the second stage (e.g., loopback stage) to the third stage (e.g., egress stage), among other information.

More particularly, as indicated by reference number 135, the sampling aggregator device 104 may determine aggregate sampling information based on multi-stage sampling information (e.g., the first-stage sampling information, the second-stage sampling information, and the third-stage sampling information). In some aspects, the aggregate sampling information may include a combination of the first-stage sampling information, the second-stage sampling information, and the third-stage sampling information. For example, the sampling aggregator device 104 may identify that the first-stage sampling information, the second-stage sampling information, and the third-stage sampling information are associated with a same packet (e.g., via the unique packet ID appended to each sample) and/or the sampling aggregator device 104 may identify that the second-stage sampling information is associated with the packet at a later portion of the packet forwarding path than the first-stage sampling information and/or that the third-stage sampling information is associated with the packet at a later portion of the packet forwarding path than the second-stage sampling information (e.g., via the respective stage IDs appended to each sample, which, in this implementation, may be 1, 2, and 3, respectively). Accordingly, the sampling aggregator device 104 may combine the three sets of sampling information into a single, final sample, which may form at least part of the aggregate sampling information.

Additionally, or alternatively, the sampling aggregator device 104 may derive additional information from the sampling information to be included as at least a portion of the aggregate sampling information. For example, in implementations in which the first-stage sampling information and/or the second-stage sampling information indicates at least one of Ethernet header information, IPv6 header information, payload information, or similar information associated with the packet at the first stage (e.g., the ingress stage) and the second stage (e.g., the loopback stage), respectively, and the third-stage sampling information indicates at least one of Ethernet header information, IPv6 header information, SRv6 segment header information, payload information, or similar information associated with the packet at the third stage (e.g., the egress stage), the sampling aggregator device 104 may derive additional information associated with the packet, such as an IPV6SRH segment information associated with the packet and/or a segment list associated with the packet, among other examples. Accordingly, the sampling aggregator device 104 may include the IPV6SRH segment information associated with the packet, the segment list associated with the packet, and/or similar information as at least part of the aggregate sampling information As indicated by reference number 136, the sampling aggregator device 104 may transmit the aggregate sampling information to the sampling analyzer device 106, in a similar manner as described above in connection with reference number 116. In this way, the sampling analyzer device 106 (e.g., a flow collector) and/or a network administrator or similar entity associated with the sampling analyzer device 106 may use the aggregate sampling information to analyze overall network traffic flow and/or performance, thereby enabling optimized network device configurations and thus more efficient power, computing, and network resource consumption.

FIG. 1C shows an example 140 of information that may be indicated by a packet ID associated with (e.g., appended to) sampling information, such as the sampling information provided to the sampling aggregator device 104 described above in connection with reference numbers 112, 114, 130, 132, and 134. The example 140 may be associated with a unicast packet (e.g., a packet transmitted to a single recipient and/or a single destination). As indicated in FIG. 1C, the unicast packet may originate at (e.g., may be ingressed from) a wide area network (WAN), may be forwarded through a network via multiple line cards (LCs) and/or PFEs (as example packet forwarding devices), and may egress to another WAN. More particularly, the unicast packet may originate from a WAN, may be routed to a first LC (indexed as LC-0) associated with a first PFE (indexed as PFE-1), may then be routed to a second LC (indexed as LC-1) associated with the first PFE (e.g., PFE-1), may then be routed to a third LC (indexed as LC-2) associated with a second PFE (indexed as PFE-2), and may ultimately be egressed to a WAN associated with a recipient and/or destination address. In such aspects, each LC, as an example packet forwarding device, may be configured to provide staged sampling information to the sampling aggregator device 104 and/or to append a packet ID to the sampling information, such as for a purpose of the sampling aggregator device 104 to be able to identify that multiple samples are associated with the packet and/or to be able to identify a sequential order of the samples.

More particularly, as indicated by the table shown in connection with example 140, the packet ID may include a quantity of bits (e.g., 64 bits) that include a user-configured value field 142, a unique packet ID field 144, an LC ID field 146, a PFE ID field 148, an application ID field 150, and/or a sampling stage ID field 152. In such implementations, a packet forwarding device associated with an ingress path of a packet forwarding path, such as LC-0 in the example shown in FIG. 1C, may mark a packet for staged sampling (e.g., according to a 1/N sampling rate), may set one or more fields of the packet ID associated with the packet, and/or may mark the packet with the packet ID. For example, the LC-0 may set the user-configured value field 142 with a user-configured value to a certain value according to user implementation, may generate a unique packet ID value and/or set the unique packet ID field 144 with the unique packet ID, may set the LC ID field 146 with a value corresponding to the LC-0 (e.g., 0 in this example), may set the PFE ID field 148 with a value corresponding to the PFE-1 (e.g., 1 in this example), may set the application ID field 150 with a programmed application ID (e.g., an ID corresponding to an application associated with the sampling analyzer device 106 and/or another application for which the sampling information is being collected), and/or may set the sampling stage ID field 152 with a value indicating the stage for which sampling information is being collected. For example, for an ingress LC and/or a first packet forwarding device in a packet forwarding path (e.g., a device that initially marks a packet for aggregate sampling), the stage ID may be set to "1." Accordingly, by including such a packet ID with sampling information provided to the sampling aggregator device 104 (e.g., the first-stage sampling information described above in connection with reference number 130), the sampling aggregator device 104 may be informed of where the sampling information originated from (e.g., via the LC ID field 146 and/or the PFE ID field 148), what packet the sampling information corresponds to (e.g., via the unique packet ID field 144), what application the sampling information is to be transmitted to (e.g., via the application ID field 150), and/or what sequential stage in the packet forwarding path the sampling information was taken from (e.g., via the sampling stage ID field 152).

As the packet is forwarded along the various stages of the packet forwarding path via the various LCs and PFEs, the various LCs and/or PFEs may similarly set and/or reset the various fields of the packet ID and/or mark the packet and/or sampling information associated with the packet with the packet ID, thereby providing similar information about subsequent sampling information transmitted to the sampling aggregator device 104. For example, a packet forwarding device associated with a loopback path of a packet forwarding path, such as LC-1 in the example shown in FIG. 1C, may retain the user-configured value in the user-configured value field 142, may retain the unique packet ID in the unique packet ID field 144, may set the LC ID field 146 with a value corresponding to the LC-1 (e.g., 1 in this example), may set the PFE ID field 148 with a value corresponding to the PFE-1 (e.g., 1 in this example), may retain the programmed application ID in the application ID field 150, and/or may increment the sampling stage ID field 152 by one (e.g., set the sampling stage ID field 152 to "2"). Accordingly, by including such a packet ID with second-stage sampling information (e.g., the second-stage sampling information described above in connection with reference number 132) provided to the sampling aggregator device 104, the sampling aggregator device 104 may be informed that the second-stage sampling information corresponds to the packet for which the first-stage sampling information was received, because both sets of sampling information include the same unique packet ID, and/or that the second-stage sampling information corresponds to a sample taken subsequent to the first-stage sampling information, because the sampling stage ID for the second-stage sampling information (sometimes referred to herein as a second-stage ID) may be equal to the sampling stage ID for the first-stage sampling information (sometimes referred to herein as a first-stage ID) incremented by one. Put another way, a sampling stage ID may be "1" for a first packet forwarding device (e.g., the packet that initiates the staged sampling and/or marks the packet for staged sampling) and may thereafter be incremented by one at each sampling stage (e.g., "2" for a second stage, "3" for a third stage, and so forth) such that the samples provided to the sampling aggregator device 104 may thereafter be sequentially ordered.

In that regard, a packet forwarding device associated with an egress path of a packet forwarding path, such as LC-2 in the example shown in FIG. 1C, may retain the user-configured value in the user-configured value field 142, may retain the unique packet ID in the unique packet ID field 144, may set the LC ID field 146 with a value corresponding to the LC-2 (e.g., 2 in this example), may set the PFE ID field 148 with a value corresponding to the PFE-2 (e.g., 2 in this example), may retain the programmed application ID in the application ID field 150, and/or may increment the sampling stage ID field 152 by one from the value set by the previous LC (e.g., set the sampling stage ID field 152 to "3," which may be the value set by LC-1 incremented by 1). Accordingly, by including such a packet ID with third-stage sampling information (e.g., the third-stage sampling information described above in connection with reference number 134) provided to the sampling aggregator device 104, the sampling aggregator device 104 may be informed that the third-stage sampling information corresponds to the packet for which the first-stage sampling information and the second-stage sampling information was received, because all three sets of sampling information include the same unique packet ID, and/or that the third-stage sampling information corresponds to a sample taken subsequent to the first-stage sampling information and the second-stage sampling information, because the sampling stage ID for the third-stage sampling information (sometimes referred to herein as a third-stage ID) may be equal to the sampling stage ID for the second-stage sampling information (e.g., the second-stage ID) incremented by one.

In some implementations, a packet may be a multicast and/or broadcast packet (e.g., a packet may be associated with a multicast and/or broadcast transmission), which may be a packet that is forwarded to multiple recipients and/or multiple destinations. In such implementations, a packet may be forwarded to the various recipients and/or destinations via respective packet forwarding paths (sometimes referred to as respective legs), and thus a sampling stage ID may be incremented in each leg irrespective of the sampling stage IDs in other legs.

More particularly, FIG. 1D shows an example 154 of information that may be indicated by a packet ID associated with (e.g., appended to) sampling information, such as sampling information provided to the sampling aggregator device 104 as described above in connection with reference numbers 112, 114, 130, 132, and 134. The example 154 may be associated with a multicast and/or broadcast packet (e.g., a packet transmitted to multiple recipients and/or multiple destinations simultaneously). As indicated in FIG. 1D, in this implementation the multicast/broadcast packet may originate at LC-0 from a WAN, and/or may be simultaneously forwarded to LC-1 (e.g., as a first leg of the multicast/ broadcast transmission) and LC-2 (e.g., as a second leg of the multicast/broadcast transmission).

In such implementations, LC-0 may set the packet ID fields in a substantially similar manner as described above in connection with the example 140. Moreover, LC-1 and LC-2 may set the user-configured value field 142, the unique packet ID field 144, the LC ID field 146, the PFE ID field 148, and/or the application ID field 150 in a substantially similar manner as described above in connection with the example 140. However, because LC-1 and LC-2 form parts of different packet forwarding paths (e.g., different legs) in this example, each LC may set the sampling stage ID field 152 independent of each other. More particularly, a packet forwarding device associated with a first packet forwarding path (e.g., a first leg of the multicast/broadcast transmission), such as LC-1 in the example shown in FIG. 1D, may increment a value of the sampling stage ID field 152 set by the first packet forwarding device (e.g., LC-0) by one (e.g., LC-1 may set the sampling stage ID field 152 to "2"). Similarly, a packet forwarding device associated with a second packet forwarding path (e.g., a second leg of the multicast/broadcast transmission), such as LC-2 in the example shown in FIG. 1D, may increment a value of the sampling stage ID field 152 set by the first packet forwarding device (e.g., LC-0) by one (e.g., may set the sampling stage ID field 152 to "2"). Accordingly, in this implementation, sampling information provided by both LC-1 and LC-2 may include a same stage ID (e.g., 2), which may indicate to the sampling aggregator device that LC-1 and LC-2 form portions of parallel packet forwarding paths (e.g., that LC-1 and LC-2 form two legs of a multicast/broadcast transmission).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
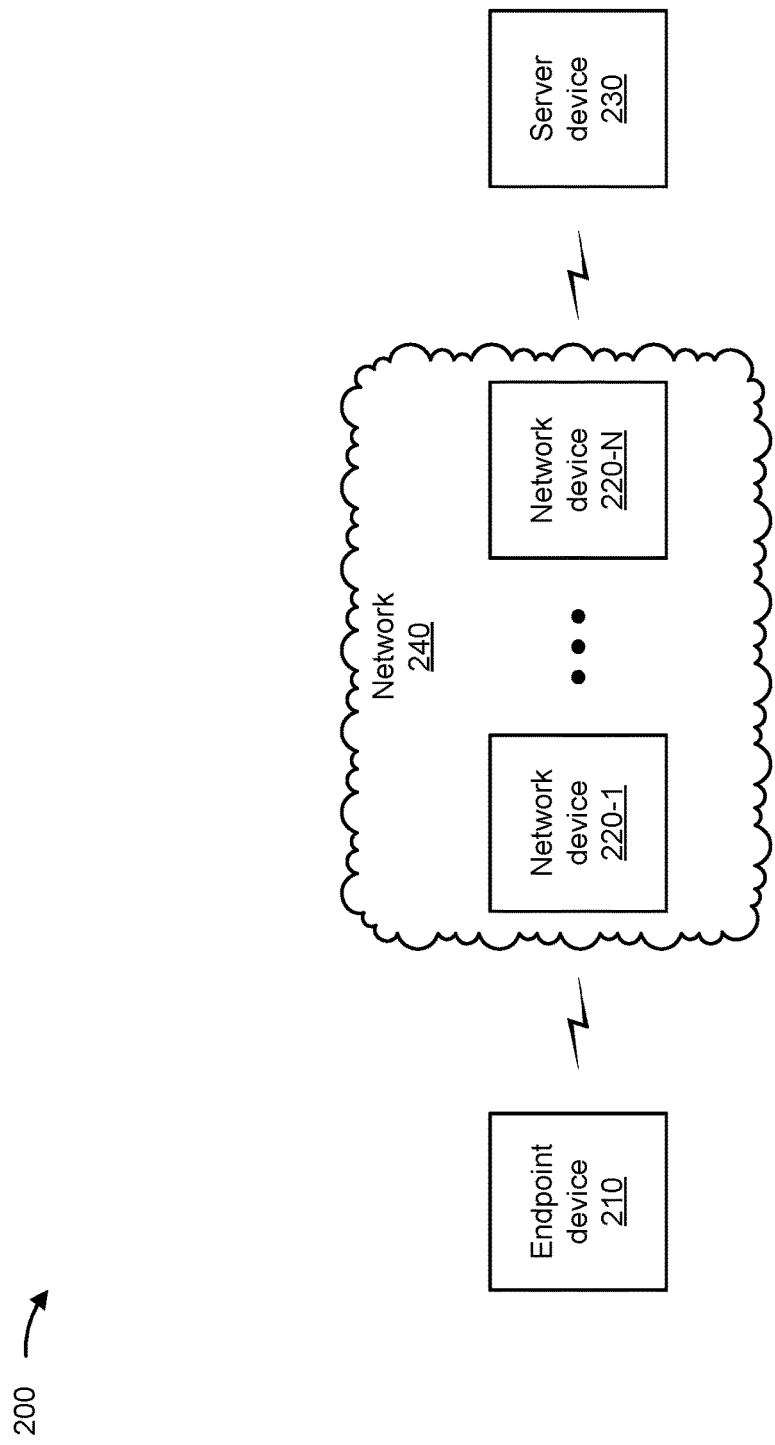
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 and/or server device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Server device 230 includes one or more devices capable of receiving, generating, storing, processing, and/or providing information, such as information described herein. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to endpoint device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
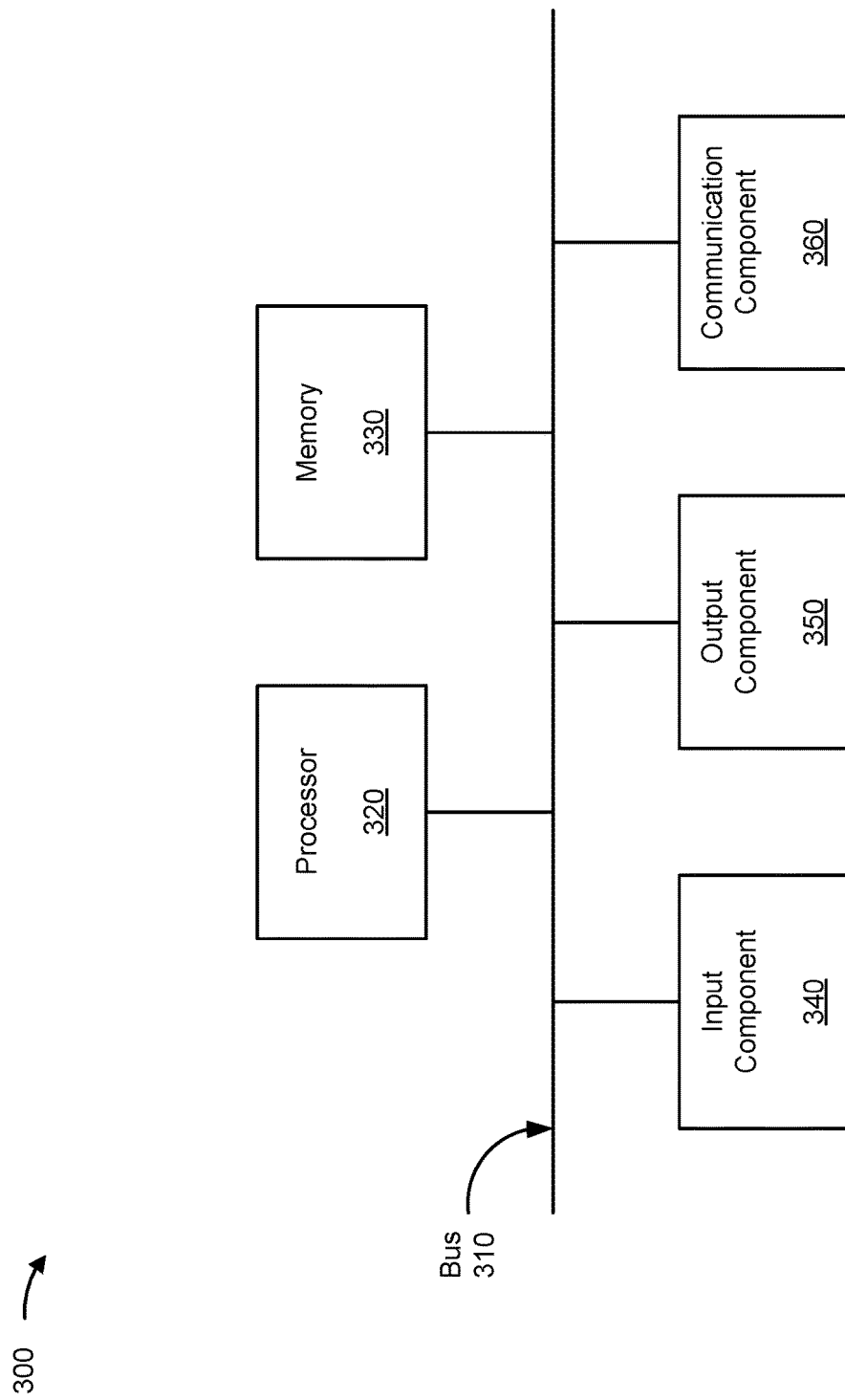
FIG. 3 is a diagram of example components of a device associated with staged sampling information for network traffic.

FIG. 3 is a diagram of example components of a device 300 associated with staged sampling information for network traffic. The device 300 may correspond to the packet routing device 102, the sampling aggregator device 104, the sampling analyzer device 106, the first ingress PFE 118, the second ingress PFE 120, the egress PFE 122, a device associated with the fabric 124, the endpoint device 210, the network device 220, and/or the server device 230. In some implementations, the packet routing device 102, the sampling aggregator device 104, the sampling analyzer device 106, the first ingress PFE 118, the second ingress PFE 120, the egress PFE 122, a device associated with the fabric 124, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
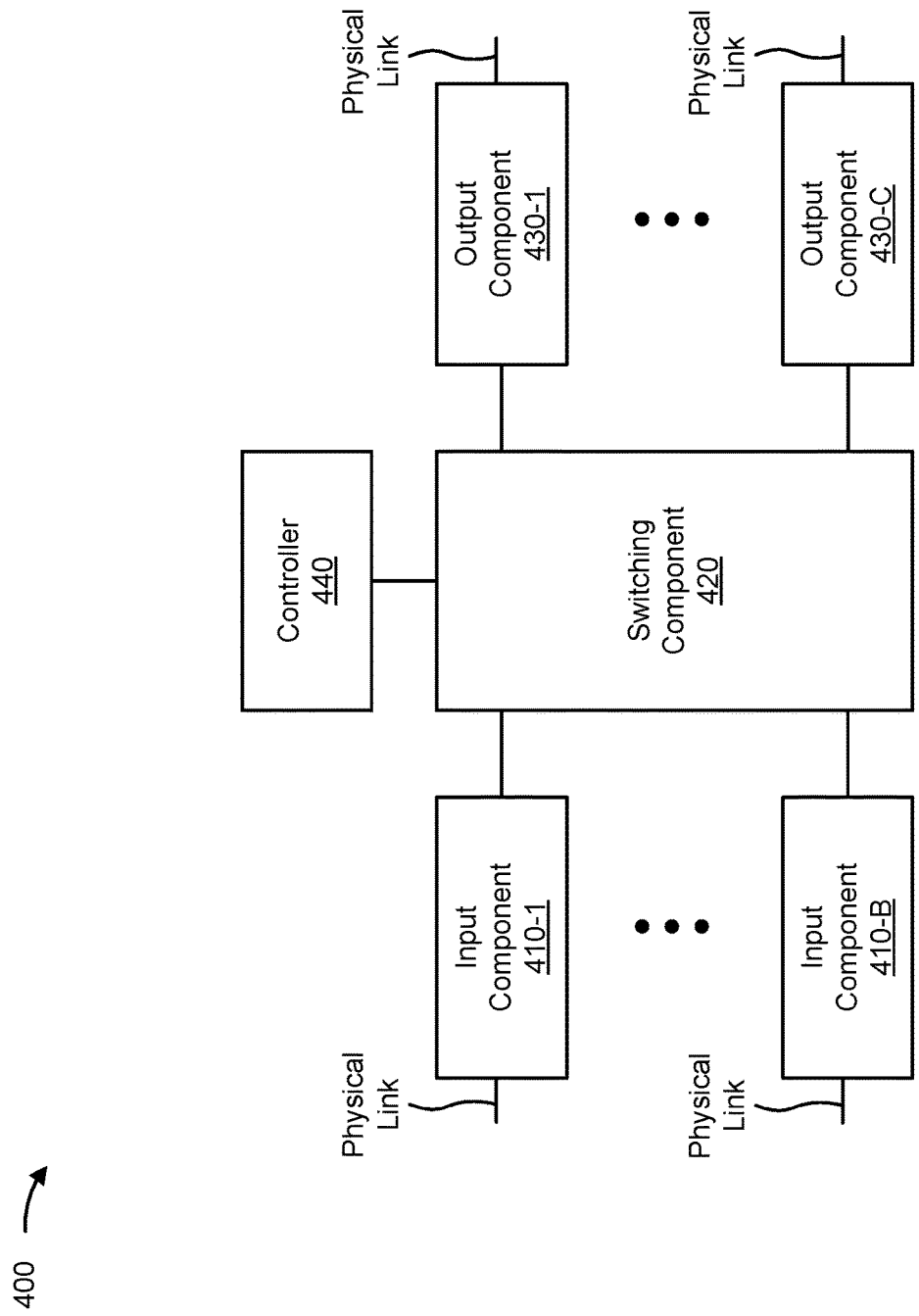
FIG. 4 is another diagram of example components of a device associated with staged sampling information for network traffic.

FIG. 4 is a diagram of example components of a device 400 associated with staged sampling information for network traffic. Device 400 may correspond to the packet routing device 102, the sampling aggregator device 104, the sampling analyzer device 106, the first ingress PFE 118, the second ingress PFE 120, the egress PFE 122, a device associated with the fabric 124, the endpoint device 210, the network device 220, and/or the server device 230. In some implementations, the packet routing device 102, the sampling aggregator device 104, the sampling analyzer device 106, the first ingress PFE 118, the second ingress PFE 120, the egress PFE 122, a device associated with the fabric 124, the endpoint device 210, the network device 220, and/or the server device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
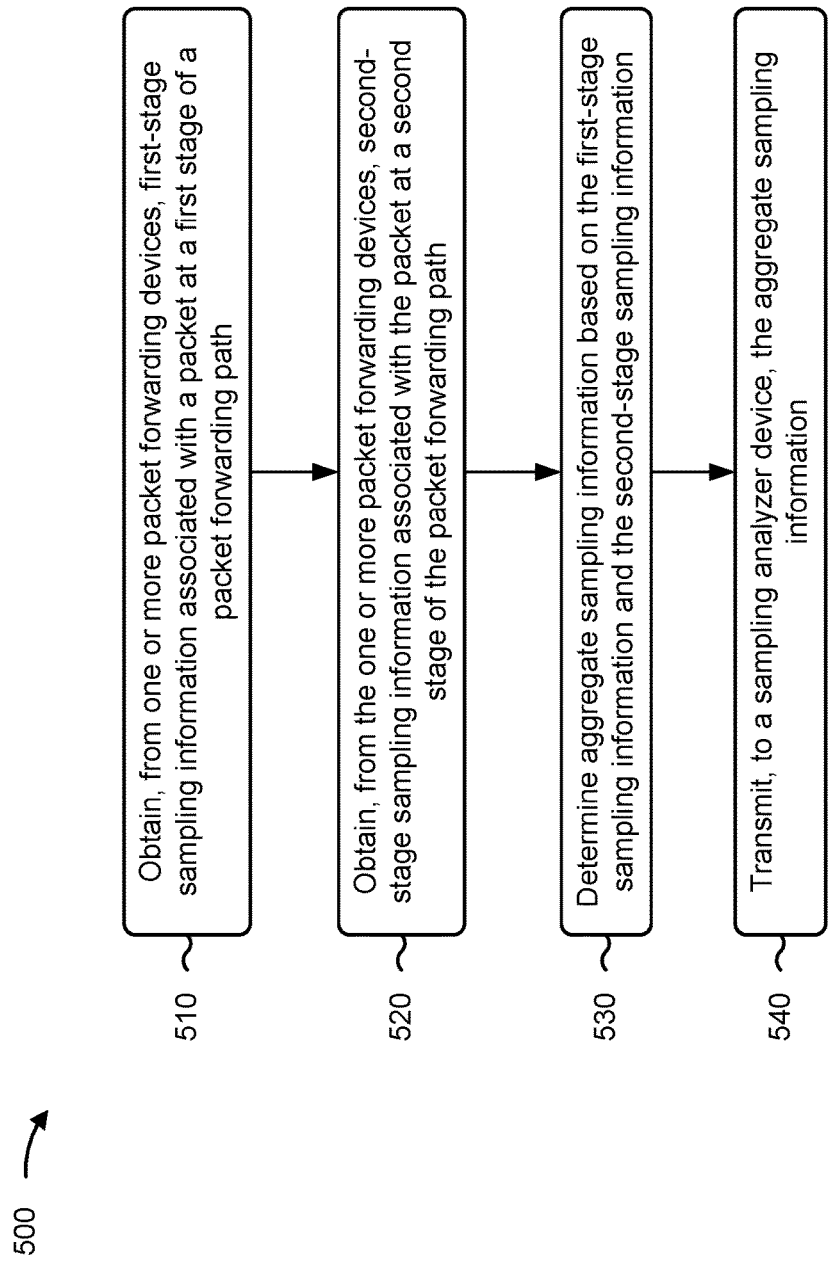
FIG. 5 is a flowchart of an example process associated with staged sampling information for network traffic.

FIG. 5 is a flowchart of an example process 500 associated with staged sampling information for network traffic. In some implementations, one or more process blocks of FIG. 5 are performed by a sampling aggregator device (e.g., sampling aggregator device 104). In some implementations, one or more process blocks of FIG. 5 are performed by another device or a group of devices separate from or including the sampling aggregator device, such as a packet routing device (e.g., packet routing device 102), a sampling analyzer device (e.g., sampling analyzer device 106), a PFE (e.g., ingress PFE 118, ingress PFE 120, and/or egress PFE 122), a device associated with a switch fabric (e.g., a device associated with fabric 124), an endpoint device (e.g., endpoint device 210), a network device (e.g., network device 220), and/or a server device (e.g., server device 230). Additionally, or alternatively, one or more process blocks of FIG. 5 may be performed by one or more components of device 300, such as processor 320, memory 330, input component 340, output component 350, and/or communication component 360, and/or one or more components of device 400, such as input component 410, switching component 420, output component 430, and/or controller 440.

As shown in FIG. 5, process 500 may include obtaining, from one or more packet forwarding devices, first-stage sampling information associated with a packet at a first stage of a packet forwarding path (block 510). For example, the sampling aggregator device may obtain, from one or more packet forwarding devices, first-stage sampling information associated with a packet at a first stage of a packet forwarding path, as described above.

As further shown in FIG. 5, process 500 may include obtaining, from the one or more packet forwarding devices, second-stage sampling information associated with the packet at a second stage of the packet forwarding path (block 520). For example, the sampling aggregator device may obtain, from the one or more packet forwarding devices, second-stage sampling information associated with the packet at a second stage of the packet forwarding path, as described above.

As further shown in FIG. 5, process 500 may include determining aggregate sampling information based on the first-stage sampling information and the second-stage sampling information (block 530). For example, the sampling aggregator device may determine aggregate sampling information based on the first-stage sampling information and the second-stage sampling information, as described above.

As further shown in FIG. 5, process 500 may include transmitting, to a sampling analyzer device, the aggregate sampling information (block 540). For example, the sampling aggregator device may transmit, to the sampling analyzer device, the aggregate sampling information, as described above.

Process 500 may include additional implementations, such as any single implementation or any combination of implementations described below and/or in connection with one or more other processes described elsewhere herein.

In a first implementation, the first stage of the packet forwarding path is associated with an ingress path of the packet forwarding path, and the second stage of the packet forwarding path is associated with an egress path of the packet forwarding path.

In a second implementation, alone or in combination with the first implementation, process 500 includes obtaining, from the one or more packet forwarding devices, third-stage sampling information associated with the packet at a third stage of the packet forwarding path, wherein the third stage of the packet forwarding path is associated with a loopback path of the packet forwarding path.

In a third implementation, alone or in combination with one or more of the first and second implementations, the first-stage sampling information indicates a first packet identifier that includes a first-stage identifier, the second-stage sampling information indicates a second packet identifier that includes a second-stage identifier, and the second-stage identifier is equal to the first-stage identifier incremented by one.

In a fourth implementation, alone or in combination with one or more of the first through third implementations, the first packet identifier and the second packet identifier further include at least one of a user-configured value field, a packet identifier field, a line card identifier field, a packet forwarding engine identifier field, an application identifier field, or a sampling stage identifier field.

In a fifth implementation, alone or in combination with one or more of the first through fourth implementations, the packet is marked for sampling by the one or more packet forwarding devices, and obtaining the first-stage sampling information and the second-stage sampling information is based on the packet being marked for sampling.

In a sixth implementation, alone or in combination with one or more of the first through fifth implementations, the first-stage sampling information indicates at least one of Ethernet header information associated with the packet at the first stage of the packet forwarding path, IPv6 header information associated with the packet at the first stage of the packet forwarding path, or payload information associated with the packet at the first stage of the packet forwarding path, and the second-stage sampling information indicates at least one of Ethernet header information associated with the packet at the second stage of the packet forwarding path, IPv6 header information associated with the packet at the second stage of the packet forwarding path, SRv6 segment header information associated with the packet at the second stage of the packet forwarding path, or payload information associated with the packet at the second stage of the packet forwarding path.

In a seventh implementation, alone or in combination with one or more of the first through sixth implementations, process 500 includes determining, based on the first-stage sampling information and the second-stage sampling information, at least one of an IPV6SRH segment information associated with the packet or a segment list associated with the packet, and indicating, to the sampling analyzer device via the aggregate sampling information, the at least one of the IPV6SRH segment information associated with the packet or the segment list associated with the packet.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
obtaining, at a sampling aggregator device from one or more packet forwarding devices in a network, first-stage sampling information associated with a packet at a first stage of a packet forwarding path;
obtaining, at the sampling aggregator device from the one or more packet forwarding devices, second-stage sampling information associated with the packet at a second stage of the packet forwarding path;
determining, by the sampling aggregator device, aggregate sampling information based on the first-stage sampling information and the second-stage sampling information;
determining, by the sampling aggregator device and from the aggregate sampling information, at least one of an Internet protocol version 6 (IPv6) segment routing header (IPv6SRH) segment information associated with the packet or a segment list associated with the packet;
transmitting, by the sampling aggregator device to a sampling analyzer device, the aggregate sampling information;
indicating, by the sampling aggregator device and to the sampling analyzer device via the aggregate sampling information, the at least one of the IPV6SRH segment information associated with the packet or the segment list associated with the packet; and
causing, by the sampling aggregator device, the sampling analyzer device to modify network device configurations using the aggregate sampling information.

2. The method of claim 1, wherein the first stage of the packet forwarding path is associated with an ingress path of the packet forwarding path, and
wherein the second stage of the packet forwarding path is associated with an egress path of the packet forwarding path.

3. The method of claim 2, further comprising obtaining, at the sampling aggregator device from the one or more packet forwarding devices, third-stage sampling information associated with the packet at a third stage of the packet forwarding path,
wherein the third stage of the packet forwarding path is associated with a loopback path of the packet forwarding path.

4. The method of claim 1, wherein the first-stage sampling information indicates a first packet identifier that includes a first-stage identifier,
wherein the second-stage sampling information indicates a second packet identifier that includes a second-stage identifier, and
wherein the second-stage identifier is equal to the first-stage identifier incremented by one.

5. The method of claim 4, wherein the first packet identifier and the second packet identifier further include at least one of a user-configured value field, a packet identifier field, a line card identifier field, a packet forwarding engine identifier field, an application identifier field, or a sampling stage identifier field.

6. The method of claim 1, wherein the packet is marked for sampling by the one or more packet forwarding devices, and
wherein obtaining the first-stage sampling information and the second-stage sampling information is based on the packet being marked for sampling.

7. The method of claim 1, wherein the first-stage sampling information indicates at least one of Ethernet header information associated with the packet at the first stage of the packet forwarding path, IPv6 header information associated with the packet at the first stage of the packet forwarding path, or payload information associated with the packet at the first stage of the packet forwarding path, and
wherein the second-stage sampling information indicates at least one of Ethernet header information associated with the packet at the second stage of the packet forwarding path, IPv6 header information associated with the packet at the second stage of the packet forwarding path, segment routing IPv6 (SRv6) segment header information associated with the packet at the second stage of the packet forwarding path, or payload information associated with the packet at the second stage of the packet forwarding path.

8. The method of claim 1, wherein the first-stage sampling information is associated with a generic routing encapsulation (GRE) decapping stage.

9. A sampling aggregator device, comprising:
one or more memories; and
one or more processors to:
obtain, from a packet routing device in a network, first-stage sampling information associated with a packet at a first stage of a packet forwarding path;
obtain, from the packet routing device, second-stage sampling information associated with the packet at a second stage of the packet forwarding path;
determine aggregate sampling information based on the first-stage sampling information and the second-stage sampling information;
determine, from the aggregate sampling information, at least one of an Internet protocol version 6 (IPv6) segment routing header (IPv6SRH) segment information associated with the packet or a segment list associated with the packet;
transmit, to a sampling analyzer device, the aggregate sampling information;
indicate, to the sampling analyzer device via the aggregate sampling information, the at least one of the IPV6SRH segment information associated with the packet or the segment list associated with the packet; and
cause the packet routing device to be reconfigured using aggregate sampling information.

10. The sampling aggregator device of claim 9, wherein the first stage of the packet forwarding path is associated with an ingress path of the packet forwarding path, and
wherein the second stage of the packet forwarding path is associated with an egress path of the packet forwarding path.

11. The sampling aggregator device of claim 9, wherein the first-stage sampling information indicates a first packet identifier that includes a first-stage identifier, wherein the second-stage sampling information indicates a second packet identifier that includes a second-stage identifier, and wherein the second-stage identifier is equal to the first-stage identifier incremented by one.

12. The sampling aggregator device of claim 9, wherein the packet is marked for sampling by an ingress portion of the packet routing device, and wherein obtaining the first-stage sampling information and the second-stage sampling information is based on the packet being marked for sampling.

13. The sampling aggregator device of claim 9, wherein the first-stage sampling information indicates at least one of Ethernet header information associated with the packet at the first stage of the packet forwarding path IPv6 header information associated with the packet at the first stage of the packet forwarding path, or payload information associated with the packet at the first stage of the packet forwarding path, and wherein the second-stage sampling information indicates at least one of Ethernet header information associated with the packet at the second stage of the packet forwarding path, IPv6 header information associated with the packet at the second stage of the packet forwarding path, segment routing IPv6 (SRv6) segment header information associated with the packet at the second stage of the packet forwarding path, or payload information associated with the packet at the second stage of the packet forwarding path.

14. The sampling aggregator device of claim 9, wherein the first-stage sampling information is associated with a generic routing encapsulation (GRE) decapping stage.

15. A non-transitory computer-readable medium storing a set of instructions, the set of instructions comprising:

one or more instructions that, when executed by one or more processors of a sampling aggregator device, cause the sampling aggregator device to:

obtain, at a sampling aggregator device from a first packet forwarding engine in a network, first-stage sampling information associated with a packet at a first stage of a packet forwarding path;

obtain, at the sampling aggregator device from a second packet forwarding engine in the network, second-stage sampling information associated with the packet at a second stage of the packet forwarding path;

obtain, at the sampling aggregator device from a third packet forwarding engine in the network, third-stage sampling information associated with the packet at a third stage of the packet forwarding path;

determine aggregate sampling information based on the first-stage sampling information, the second-stage sampling information, and the third-stage sampling information;

determine, from the aggregate sampling information, at least one of an Internet protocol version 6 (IPv6) segment routing header (IPv6SRH) segment information associated with the packet or a segment list associated with the packet;

transmit, to a sampling analyzer device, the aggregate sampling information;

indicate, to the sampling analyzer device via the aggregate sampling information, the at least one of the IPV6SRH segment information associated with the packet or the segment list associated with the packet; and cause one or more devices in the network to reconfigure the network using the aggregate sampling information.

16. The non-transitory computer-readable medium of claim 15, wherein the first stage of the packet forwarding path is associated with an ingress path of the packet forwarding path, wherein the second stage of the packet forwarding path is associated with a loopback path of the packet forwarding path, and wherein the third stage of the packet forwarding path is associated with an egress path of the packet forwarding path.

17. The non-transitory computer-readable medium of claim 15, wherein the first-stage sampling information indicates a first packet identifier that includes a first-stage identifier, wherein the second-stage sampling information indicates a second packet identifier that includes a second-stage identifier with the second-stage identifier being equal to the first-stage identifier incremented by one, and wherein the third-stage sampling information indicates a third packet identifier that includes a third-stage identifier with the third-stage identifier being equal to the second-stage identifier incremented by one.

18. The non-transitory computer-readable medium of claim 15, wherein the packet is marked for sampling by the first packet forwarding engine, and wherein obtaining the first-stage sampling information, the second-stage sampling information, and the third-stage sampling information is based on the packet being marked for sampling.

19. The non-transitory computer-readable medium of claim 15, wherein at least one of the first-stage sampling information or the second-stage sampling information indicates at least one of Ethernet header information associated with the packet at the first stage of the packet forwarding path or the second stage of the packet forwarding path, respectively, IPv6 header information associated with the packet at the first stage of the packet forwarding path or the second stage of the packet forwarding path, respectively, or payload information associated with the packet at the first stage of the packet forwarding path or the second stage of the packet forwarding path, respectively, and wherein the third-stage sampling information indicates at least one of Ethernet header information associated with the packet at the third stage of the packet forwarding path, IPv6 header information associated with the packet at the third stage of the packet forwarding path, segment routing IPv6 (SRv6) segment header information associated with the packet at the third stage of the packet forwarding path, or payload information associated with the packet at the third stage of the packet forwarding path.

20. The non-transitory computer-readable medium of claim 15, wherein the first-stage sampling information is associated with a generic routing encapsulation (GRE) decapping stage.

* * * * *